Figure 3:
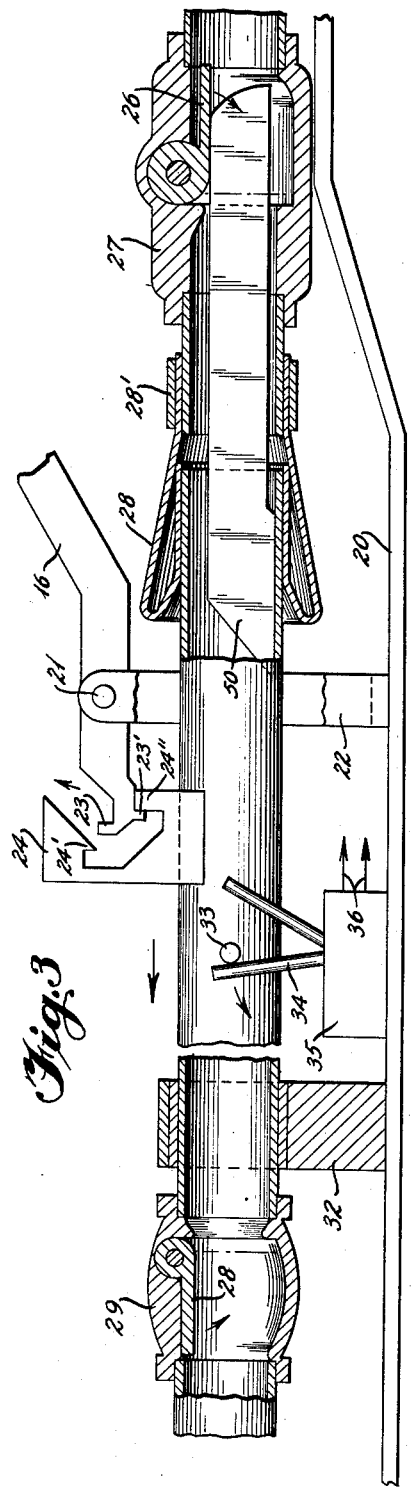

March 12, 1963 R. T. McKIE 3,080,880
AUTOMATIC SWITCHOVER COUPLING FOR WATER SYSTEMS
Filed Feb. 29, 1960 4 Sheets-Sheet 1
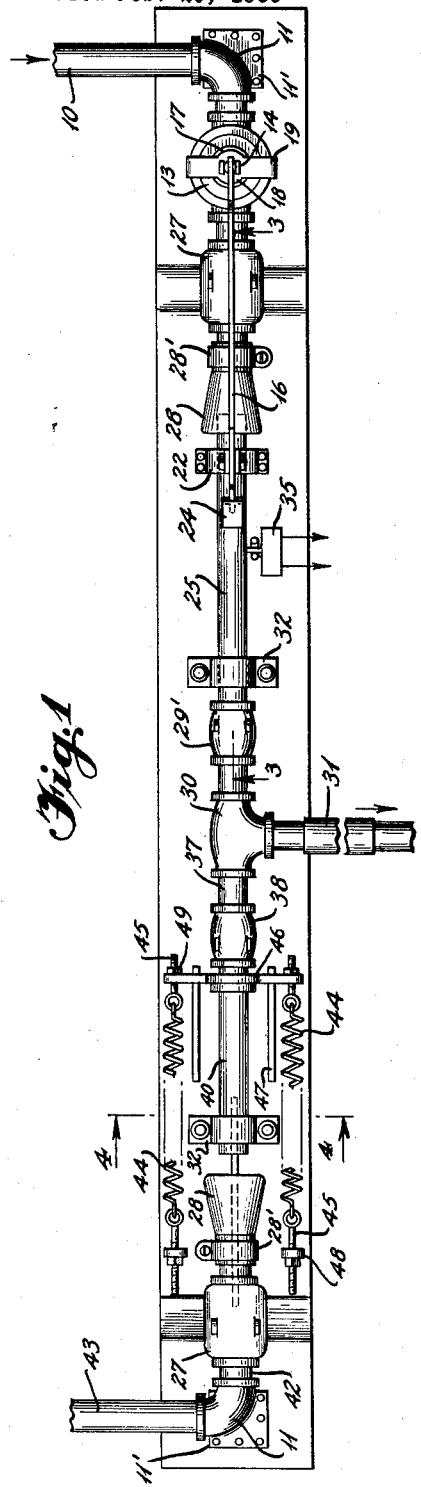
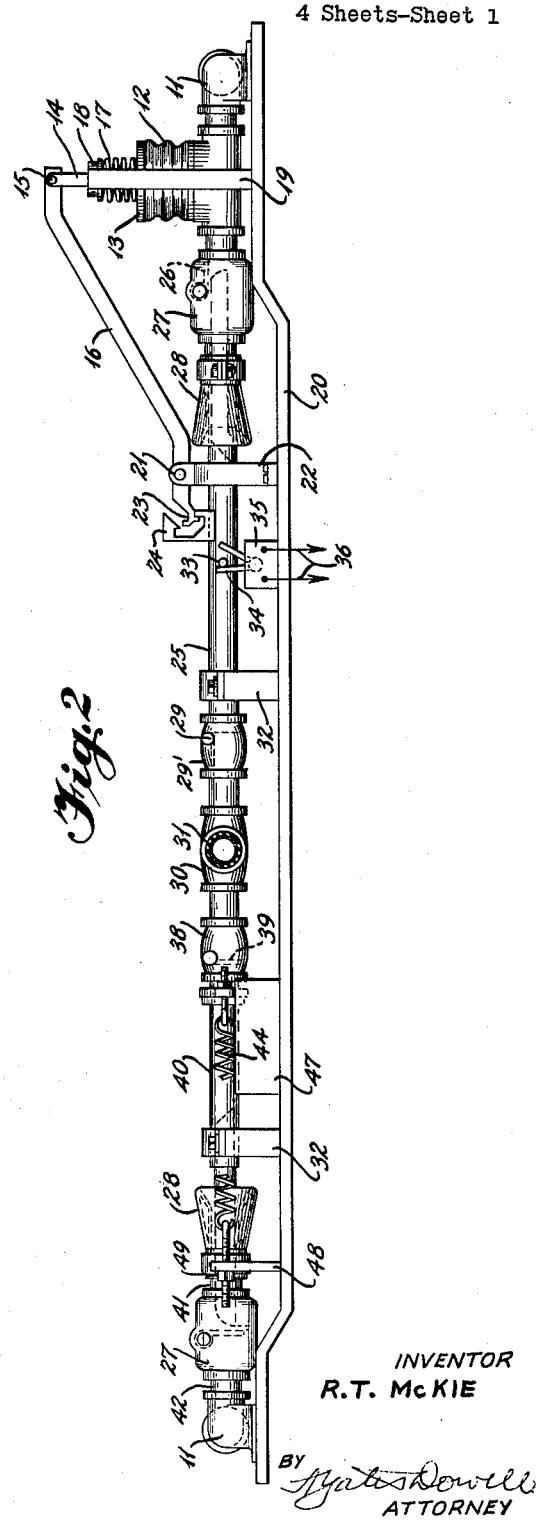
INVENTOR
R.T. McKIE
BY
ATTORNEY March 12, 1963

R. T. McKIE 3,080,880

AUTOMATIC SWITCHOVER COUPLING FOR WATER SYSTEMS

Filed Feb. 29, 1960

4 Sheets-Sheet 2

INVENTOR
R.T. McKIE

BY
*A. Yates Dowell*
ATTORNEY

March 12, 1963
R. T. McKIE
3,080,880
AUTOMATIC SWITCHOVER COUPLING FOR WATER SYSTEMS
Filed Feb. 29, 1960
4 Sheets-Sheet 3
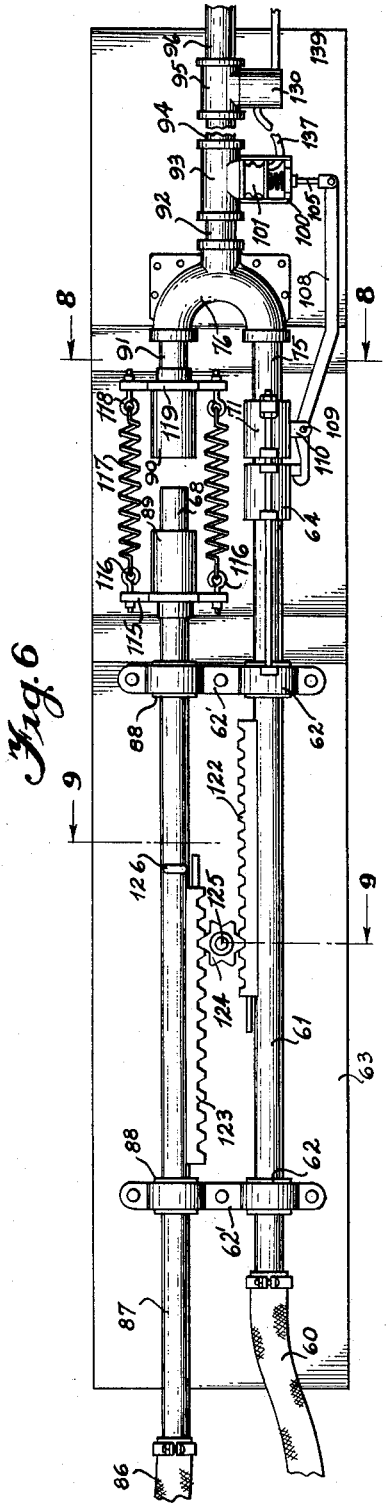
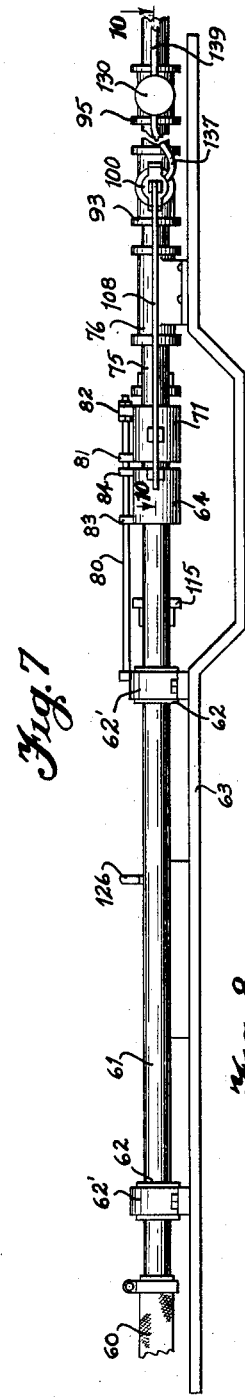
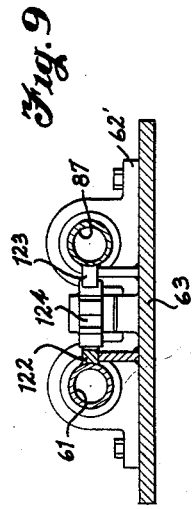
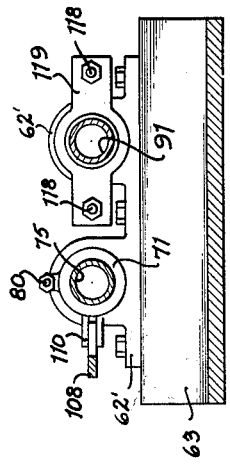
INVENTOR
R. T. McKIE
BY A. Yates Dowell
ATTORNEY March 12, 1963 R. T. McKIE 3,080,880
AUTOMATIC SWITCHOVER COUPLING FOR WATER SYSTEMS
Filed Feb. 29, 1960 4 Sheets-Sheet 4

INVENTOR
R. T. McKIE
BY A. Yates Dowell
ATTORNEY

United States Patent Office 3,080,880
Patented Mar. 12, 1963

3,080,880
AUTOMATIC SWITCHOVER COUPLING FOR WATER SYSTEMS
Robert T. McKie, 404 S. Peck St., Bessemer, Mich.
Filed Feb. 29, 1960, Ser. No. 11,519
9 Claims. (Cl. 137—113)

This invention relates to water distribution including systems which provide or supply water to various locations for various purposes and to the equipment by which such supply is accomplished, controlled and utilized in a sanitary and safe manner without contamination.

The invention relates particularly to systems for supplying water in substantial quantities including for use in cooling and recirculating systems near towns, municipalities and other areas from streams, ponds, wells, and other sources and to the problem of connecting the system to a second source of supply when the first fails or is inadequate.

State and municipal codes prohibit any direct connection between city water lines and a recirculating system which connection is necessary to continuously supply water upon pump failure or loss of line pressure. Consequently it has been customary to make the connection manually and this has involved delays as well as labor and expense.

It is an object of the invention to provide an automatic swing or change in connections in a water system whereby upon failure or loss of pressure or an increase in temperature in one system a connection may be made to receive water from another source or system immediately without the possibility of pollultion or violation of any sanitary codes.

Another object of the invention is to provide mechanism for automatically switching from a first independent source of water supply to a second independent source upon the failure of the first without the attention of an operator and which can be readily reset to again receive water from the first source.

A further object of the invention is to provide a water connection for receiving water from one of multiple sources and with means for breaking the connection to the first source and establishing the connection with the second source subject to the lowering of pressure from the first source.

A further object of the invention is to provide a shiftable connection in communication with a first system with pressure actuated latch means for maintaining the same in conntction with the first system and which latch means it released upon the lowering of pressure in the first system and with means for moving the connection into communication with the second system upon the release of such latch.

A further object of the invention is to provide a shiftable connection in communication with a first water supply system with pressure and temperature actuated latch means for maintaining the same in connection therewith and which latch means is released upon the lowering of pressure or the raising of the temperature in the first system and with means for automatically moving the connection into communication with a second water supply upon the release of such latch.

A still further object of the invention is to provide a shiftable connection in a water line used for other than human consumption and in communication with a first water supply such as a pond, stream or the like and with means for breaking the connection to the first system and establishing a connection with a municipal water system subject to the lowering of pressure or the raising of the temperature of the first source and in a manner not to cause pollution of the municipal water system.

Figure 5:
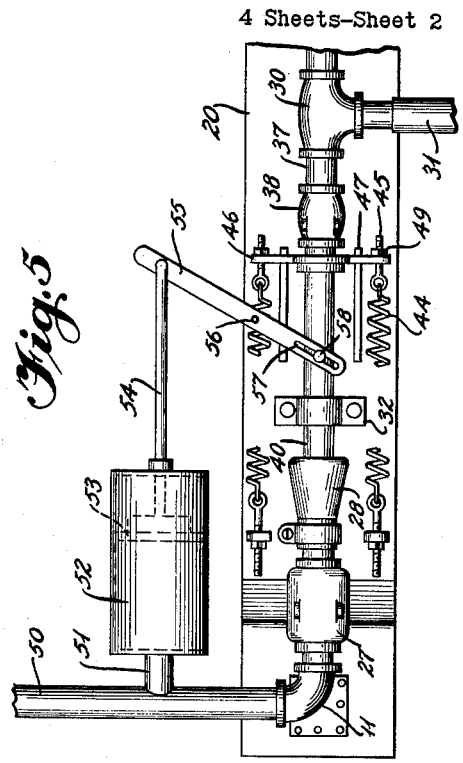
Figure 4:
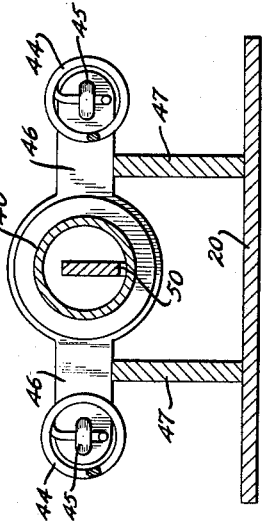
Figure 10:
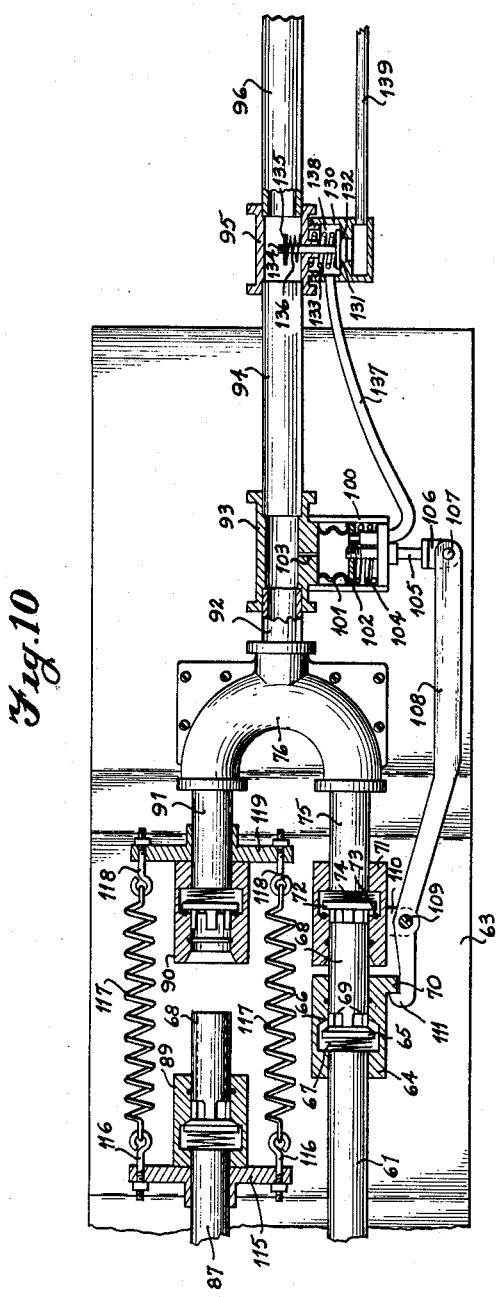
Figure 11:
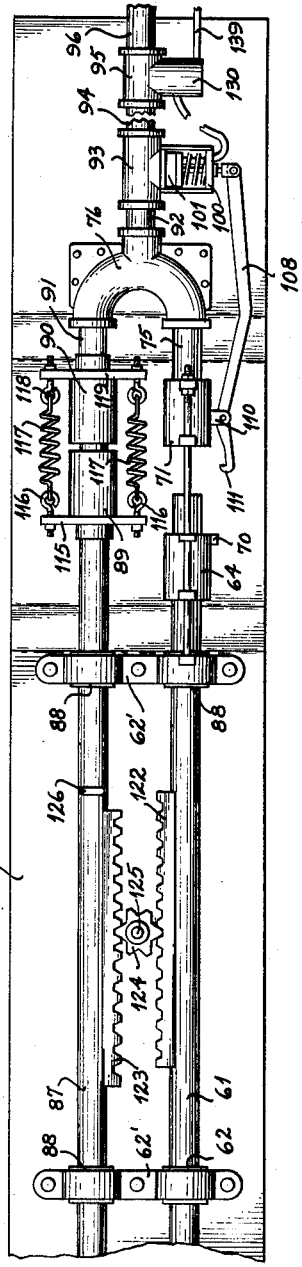

Other objects and advantages of the invention will be apparent from the following description taken in conjunction with the accompanying drawing wherein:

FIG. 1 is a top plan view illustrating one application of the invention;
FIG. 2, a side elevation thereof;
FIG. 3, an enlarged fragmentary detail on the line 3—3 of FIG. 1;
FIG. 4, a vertical section on the line 4—4 of FIG. 1;
FIG. 5, a top plan view of a modified type of the device;
FIG. 6, a top plan view of a further modified type of the device;
FIG. 7, a side elevation of the device illustrated in FIG. 6;
FIG. 8, a section on the line 8—8 of FIG. 6;
FIG. 9, a section on the line 9—9 of FIG. 6;
FIG. 10, an enlarged detail section on the line 10—10 of FIG. 7; and
FIG. 11, a top plan view similar to FIG. 6 showing the latch released and the positions of the supply lines reversed.

Briefly stated, the swing connection of the present invention is an automatically actuated device connected to a water system to supply water from one source until pressure in the system lowers or the temperature raises sufficiently to cause a latch to be released and a connection to be automatically made with a second source without interrupting the flow of water and at the same time discharge from the first source is prevented by means of a check valve.

With continued reference to the drawing, the water system includes a pipe 10 with an elbow 11 which admits water to a pressure control including a bellows 12 acting against a plate 13 to which is attached a rod 14 connected by a pivot 15 with an operating lever 16. A coil spring 17 is disposed around the rod 14 between the plate 13 and a fixed stop 18 carried by a yoke 19 mounted on a base 20. Pressure within the bellows 12 normally maintains the bellows expanded against the plate 13 to overcome the downward action of the spring 17. However, upon reduction of the pressure within the bellows, the spring 17 will expand and force the rod downwardly to rock the lever 16 about a pivot 21 carried by a bracket 22 attached to the base 20. The opposite end of the lever 16 is provided with a latch 23 for engagement with a catch 24 which holds a pipe 25 to the right so that water in the first system can flow through a check valve 26 in a check valve housing 27 and a pressure connection 28 with a yieldable annulus into the pipe 25 and from such pipe past a check valve 29 in a housing 29' and a T connection 30 to a flexible line 31 of the system. When the pressure in the control bellows 12 drops, the pipe 25 and associated parts mounted on brackets 32 are axially movable, the pipe 25 being provided with a pin or projection 33 which engages the arm 34 of an interlock switch 35 having electrical connections 36 to discontinue the operation of a pump (not shown) which supplies water to the pipe 10.

Attached to the T coupling 30 is a pipe 37 to which is connected a check valve housing 38 containing a check valve 39 and to such housing is connected a pipe 40. The free end of such pipe is adapted to engage a second coupling 28 connected by a pipe 41, a check valve housing 27, a pipe 42 and an elbow 11 with a second source of supply 43. The elbows 11 on each end of the base 20 are supported by brackets 11'. Each of the couplings 28 is fastened by clamps 28' to its respective supporting pipe and each coupling 28 is yieldably susceptible to receive the pipes 25 and 40.

When the latch 23 is released, the parts of the device, including from right to left parts 25 to 40, are urged to the left in FIGS. 1, 2 and 3 from a position coupling the first system to a position coupling the second system by means of springs 44 connected by eye-bolts 45 with a yoke 46 attached to the pipe 40, such yoke being slidable on a support 47. The opposite ends of the springs 44 are attached to eye-bolts 45 which extend to a fixed support 48 on the base 20, the tension on the springs being controlled by nuts 49 on the bolts 45 which engage the remote side of the yoke 46 and the brackets 48.

In order to open the check valve 26 and permit the flow of water when the connection is completed, the pipes 25 and 40 are provided with a projecting finger or tongue 50 which extends beyond the limits of such pipes and is adapted to engage and open the check valve 26.

In the initial starting position the connection is moved to the right as viewed in the drawings and the latch 23 engages a projection 24' in the upper portion of the catch 24 and is held in engagement therewith by the expansion of the spring 17 against the bellows 12. When pressure is applied to the line 10, the bellows 12 expands against the plate 13 and the downward pressure of the spring 17 and urges the operating lever 16 upwardly which causes the latch 23 to become disengaged from the projection 24' and a lug or projection 23' on the bottom of the latch 23 will engage a projection 24'' which extends upwardly from the lower portion of the catch 24.

In FIG. 5 is disclosed another switching or transferring structure in which the piston and cylinder, subject to pressure, with the rod of the piston engaging a lever arm which automatically shifts the connection against the action of springs which will automatically return the connection to its first position under the influence of the springs when the pressure has been restored. In other words a pipe 50 is in communication with the first system and is connected by a pipe 51 with a pressure cylinder 52 in which is mounted a piston 53 attached to a piston rod 54 connected to a lever 55 on the pivot 56 mounted to the base 20. The lever 55 has a slot 57 in which is received a pin 58 attached to the connecting pipe 40 adapted to move into and out of the coupling 28 of the first source of supply and when the pressure within the chamber 52 lowers, the lever 55 will be allowed to swing.

In the operation of the device, water pressure in the line 10 normally maintains the bellows 12 in expanded position and permits water to flow through the T connection to the point of discharge. When the pressure in the line 10 drops to a predetermined level, the pressure of the spring 17 will overcome the pressure within the bellows 12 and raise the latch 23 out of engagement with the catch 24. Upon release of such latch, springs 44 will move the connection longitudinally into engagement with a second source of water supplied through pipe 43. The movement of the connection and the tongues 50 carried thereby closes a check valve in the first system and opens a check valve in the second system to shut off the water supplied by the first system and to immediately open the second system to continue an uninterrupted flow of water. Simultaneously the pump which supplied water to the first system is deenergized by an interlock switch which remains open until such time as the connection is again placed in the initial starting position.

With reference to FIGS. 6 through 11 a further modified form of swing connection is disclosed having a flexible hose or tube 60 for supplying water from a source (not shown) to a pipe 61. Such pipe is axially slideable in a pair of bearings 62 mounted in a pair of bearing blocks 62' on a base 63. The free end of the pipe 61 terminates in a check valve housing 64 in which a valve 65 is urged towards a seat 66 by a spring 67.

The valve 65 is mounted on the end of a tube 68 having openings 69 adjacent the valve. A lug 70 projects from one side of the housing 64 the purpose of which will be described later. The tube 68 projects beyond the housing 64 in axial alignment with the pipe 61 and is adapted to be received in a cooperating check valve housing 71 having a valve 72 normally urged towards a valve seat 73 by a spring 74. The check valve housing 71 is mounted on one end of a pipe 75 the other end of which terminates in a Y-connection 76.

When the pipe 61 is extended the exposed end of the tube 68 enters the housing 71 and contacts the valve 72 to force the valve open against the tension of the spring 74. Simultaneously the valve 65 is pressed open against the tension of the spring 67 so that fluid in the pipe 61 may flow around the valve 65 and through the openings 69 in the tube 68 and then passes through the tube 68 and out around the valve 72 into the pipe 75.

In order to maintain the valve housings 64 and 71 in alignment a rod 80 is provided having one end attached to one of the bearing blocks 62' and the other end connected to lugs 81 and 82 mounted on the valve housing 71. The valve housing 64 has a pair of lugs 83 and 84 which slideably receive the rod 80 to guide the housing 64 as it moves axially relative to the housing 71.

A second water supply system is provided having a flexible hose or tube 86 connected to a pipe 87 which is axially slideable in a pair of bearings 88 mounted in the bearing blocks 62' and terminates within a check valve housing 89 similar in construction to the check valve housing 64. The tube 68 of the housing 89 is adapted to be inserted in a cooperating check valve housing 90 similar in construction to the check valve housing 71 and which is mounted on one end of a pipe 91, the opposite end of which terminates in the Y-connection 76. The common discharge pipe from the Y-connection 76 comprises a nipple 92, a T-connection 93, a short length of pipe 94, another T-connection 95 and a discharge pipe 96.

The T-connection 93 is provided with a housing 100 in which is received a bellows 101 disposed between the T-coupling 93 and a plate 102 and with the interior of the bellows being in communication with the flow of liquid through the T-coupling 93 by means of an orifice 103. Fluid under pressure passing through the T-coupling 93 is forced through the orifice into the bellows and expands the bellows to move the plate 102 outwardly against the tension of a spring 104 disposed between the top of the housing 100 and the plate 102. A rod 105 is mounted centrally of the plate 102 and extends through the top of the housing 100 where it is provided at its remote end with a yoke 106 having a pivot 107 which engages a latch arm 108. The latch arm 108 is mounted intermediate its ends to a pivot 109 carried by lugs 110 projecting from the side of the check valve housing 71. The free end of the latch arm 108 has a latch 111 which engages the projection 70 on the check valve housing 64 when the cooperating housings 64 and 71 are in operative engagement.

As fluid passes through the first water supply system pressure within the bellows will maintain the latch 111 in engagement with the projection 70 and permit continued operation of the system. When the pressure falls below a predetermined level the tension of the spring 104 overcomes the pressure within the bellows and forces the plate 102 inwardly towards the T-connection 93 and releases the latch 111 from engagement with the projection 70.

When the latch 111 is released the second water supply system is adapted automatically to connect the check valve housings 89 and 90 to continue the supply of fluid through the pipe 96. In order to do this the pipe 87 is provided with a yoke 115 having a pair of eye bolts 116 one located on each end of the yoke 115 and connected by springs 117 to a pair of eye bolts 118 mounted on a yoke 119 carried by the pipe 91. When the latch 111 is released the springs 117 contract and cause the tube 68 in the check valve housing 89 to enter the housing 90 and open the check valves in the respective housings to permit fluid to flow therethrough.

In order to make certain that the first system is not in operation simultaneously with the second system, the pipe 61 is arranged in spaced parallel relation with the pipe 87 and has a rack 122 welded or otherwise attached to the side facing the pipe 87 and the pipe 87 has a similar rack 123 welded or otherwise attached to the side facing the pipe 61. A spur gear or sprocket 124 is rotatably mounted on a stub shaft 125 carried by the base 63 and such gear engages the racks 122 and 123 in such a manner that when the pipe 87 is moved to the right as viewed in FIG. 6 it will rotate the spur gear and cause the pipe 61 to move out of operative position to the left where it will remain until the original position is manually reset by means of a cocking ring 126 on the pipe 87.

In order to provide a temperature control to switch the systems when the fluid in the first system becomes too warm, the T-connection 95 is provided with a valve housing 130 having a valve 131 urged against a valve seat 132 by a spring 133. A valve stem 134 extends inwardly through the wall of the housing 95 and projects into the flow of the fluid through the discharge pipe. A plate 135 is connected to the free end of the valve stem 134 and a thermostatic bellows 136 is interposed between the plate 135 and the wall of the housing 95 so that when the temperature of the fluid reaches a predetermined level the thermostat will expand and open the valve against the tension of the spring 133. The housing 130 is connected to the pressure actuated bellows 101 by a tube 137 which permits the fluid in the bellows 101 to flow into a chamber 138 in the housing 130. When the valve 131 is unseated fluid in the chamber 138 and in the bellows 101 is allowed to pass out through a by-pass line 139 at a greater rate than fluid is allowed to enter the bellows 101 through the orifice 103. With the consequent reduction in pressure in the bellows 101 the spring 104 will overcome the pressure within the bellows and cause the latch 111 to become disengaged from the projection 70.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An automatic connection for supplying fluids comprising a first fluid supply, a second fluid supply, a connection alternately positionable in communication with said first or said second supply, means biasing said connection toward communication with said second supply, a positive releasable trip means to retain said connection in communication with said first supply against said biasing means, and means responsive to a predetermined condition in said first supply to effect release of said trip means whereupon said connection will automatically be biased into communication with said second supply.

2. The structure of claim 1 in which said unlatching means is subject to pressure within the first supply.

3. The structure of claim 1 in which said connection moving means is spring operated.

4. The structure of claim 1 in which each of said sources is provided with a cooperative portion interfitting with said connection and including a yieldable annulus.

5. The structure of claim 1 including check valves for preventing flow from said first and second systems and arranged to be unseated by said connection.

6. The structure of claim 1 including means for shutting off a motivating power of the first supply upon the failure of the same and the connection with the second supply.

7. The structure of claim 1 in which the unlatching means includes a movable portion for releasing said latch and spring means acting against the pressure.

8. The structure of claim 1 in which said unlatching means is responsive to the temperature condition of the first supply.

9. The structure of claim 1 having positive means to insure that said first supply and said second supply are not simultaneously connected.

References Cited in the file of this patent

UNITED STATES PATENTS

| | | |
|---|---|---|
| 1,632,144 | Nemac | June 14, 1927 |
| 1,831,196 | Read | Nov. 10, 1931 |
| 2,108,182 | Searle | Feb. 15, 1938 |
| 2,795,238 | Hirsch | June 11, 1957 |
| 2,965,136 | Burris | Dec. 20, 1960 |
| 3,001,540 | Barnickel | Sept. 26, 1961 |